United States Patent [19]

Balsells

[11] Patent Number: 5,358,224
[45] Date of Patent: Oct. 25, 1994

[54] ISOLATOR MOUNT ASSEMBLY

[75] Inventor: Peter J. Balsells, P.O. Box 15092, Santa Ana, Calif. 92705

[73] Assignees: Peter J. Balsells; Joan C. Balsells, Santa Ana, Calif.

[21] Appl. No.: 917,283

[22] Filed: Jul. 23, 1992

Related U.S. Application Data

[63] Continuation of Ser. No. 656,811, Feb. 14, 1991, abandoned.

[51] Int. Cl.5 .......................... B60G 11/52; F16F 1/06
[52] U.S. Cl. ........................................ 267/33; 267/167
[58] Field of Search ............... 267/1.5, 167, 166, 287, 267/33

[56] References Cited

U.S. PATENT DOCUMENTS

| | | | |
|---|---|---|---|
| 3,183,010 | 5/1965 | Bram | 267/167 |
| 3,323,785 | 6/1967 | Mather | 267/167 |
| 3,468,527 | 9/1969 | Mather | 267/167 |
| 4,655,462 | 4/1987 | Balsells | 267/167 |
| 4,753,423 | 6/1988 | Ukai et al. | 267/167 |
| 4,763,882 | 4/1988 | Nishiyama | 267/166 |
| 4,805,943 | 2/1989 | Balsells | 267/167 |
| 4,826,144 | 5/1989 | Balsells | 267/167 |
| 4,830,344 | 5/1989 | Balsells | 267/167 |
| 4,874,154 | 10/1989 | Zimbone | 267/33 |
| 4,901,788 | 3/1990 | Balsells | 267/167 |
| 4,907,788 | 3/1990 | Balsells | 267/168 |
| 4,934,666 | 6/1990 | Balsells | 267/1.5 |
| 4,957,277 | 9/1990 | Paton | 267/33 |
| 4,974,821 | 12/1990 | Balsells | 267/167 |

Primary Examiner—David A. Bucci
Assistant Examiner—Virna Lissi Ansley
Attorney, Agent, or Firm—Walter A. Hackler

[57] ABSTRACT

An isolator mount assembly is disclosed which includes a support structure, a device and an isolator, disposed between the support structure and the device for reducing transmission of mechanical vibration therebetween. The isolator includes a plurality of canted-coils having an elliptical shape which are oriented for loading along a major or minor axis thereof. An elastomer may be applied to the coils and either bonded or unbonded thereto in order to provide the isolator with the capacity to be adapted to desired transmissibility and isolation efficiencies.

47 Claims, 12 Drawing Sheets

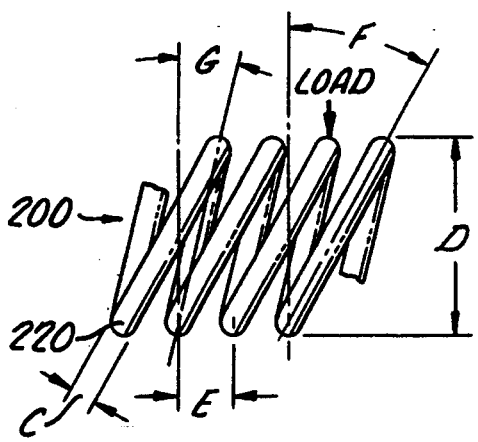
_Fig. 22._
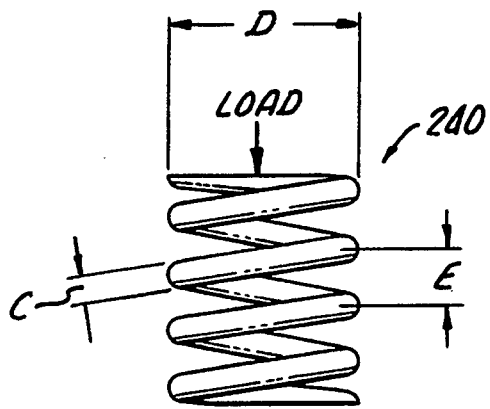
_Fig. 24._
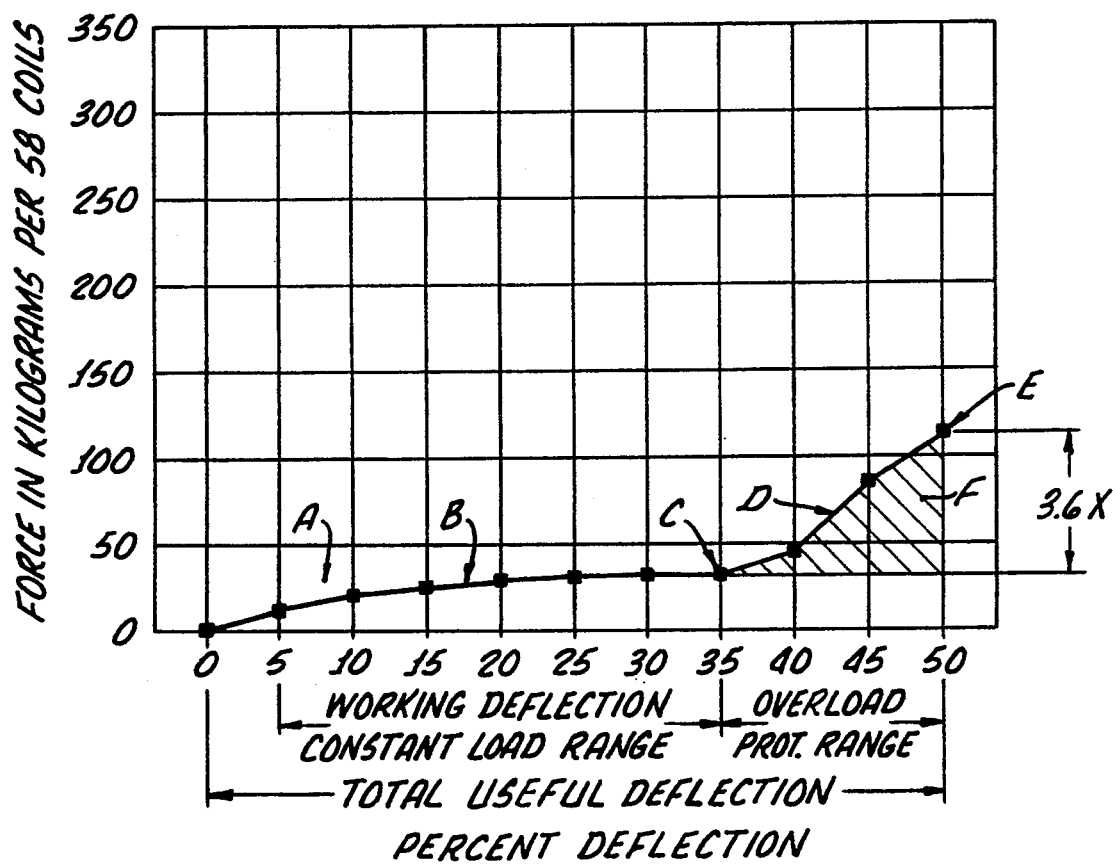
_Fig. 23._

ISOLATOR MOUNT ASSEMBLY

This application is a continuation of application Ser. No. 07/656,811, filed 14, 1991, now abandoned.

The present invention is generally related to apparatuses for controlling shock and vibration. More particularly, the present invention is directed to isolator mount assemblies useful in protecting supporting structures from vibration and shock disturbances originating in certain equipment and/or protecting sensitive equipment from shock and vibration emanating from structures on which equipment may be mounted.

In its most elementary form, a vibration isolator may be considered as a resilient member interconnecting equipment and a support structure. The function thereof is to reduce the magnitude of motion transmitted from a vibrating support structure to the equipment, or to reduce the magnitude of force transmitted from the equipment to the supporting structure.

Generally, isolator mounts may be classified as two general types: elastomer isolators and metallic spring isolators.

Elastomer isolators may be made from synthetic or natural rubber or the like and are widely used because they may be conveniently molded to fit any number of selected shapes with selected stiffness and generally have more internal damping than metallic spring isolators. Moreover, elastomer isolators usually require less space and are lighter weight than metallic isolators. The elastomer isolators may be bonded to metallic inserts to simplify attachment between equipment and support structures. Plastic materials may also be utilized if the characteristics thereof are similar to those of the rubber or synthetic rubber elastomers.

Metallic spring isolators are typically used when the static deflection requirement is large and where temperature or other environmental conditions make an elastomer isolator unsuitable.

Of the metallic spring isolator mounts, helical coil springs are the most widely used. Typically, helical springs are made from bar stock or wire rolled into a helical form, and load is applied along the axis of the helix. A helical spring usually has a straight, load-deflection characteristic as will be hereinafter discussed in greater detail. This type of spring is the simplest and most widely used energy-storage isolator.

Helical coil springs have a very high degree of deflection but relatively poor isolation properties. This characteristic should be contrasted with elastomeric isolator mounts which have good isolation properties but have limited deflection capability. With respect to load-deflection characteristics, elastomeric isolators provide a generally parabolic response which results in a nonlinear relationship between force and deflection. That is, when loading an elastomeric mount in compression, it is initially soft load; but as the load increases, a higher degree of stiffness occurs, thus increasing the amount of force developed and providing increasing shock-absorbing means.

Because of the differing characteristics of helical coil spring isolator mounts and elastomeric isolator mounts, the two are often combined in an attempt to utilize the best properties of each. However, the effectiveness of such a combined isolator may not be acceptable as will be hereinafter discussed in greater detail.

The effectiveness of an isolator is determined by a number of factors, including the energy absorption capacity thereof, the transmissibility thereof, the natural frequency of the isolator, the damping ratio or fraction of critical damping, and the isolation frequency of the overload capability of the isolator.

The present invention is directed to an isolator mount assembly which provides a high degree of deflection and, in addition, good isolation properties together with high energy storage capacity within static and overload protection ranges.

SUMMARY OF THE INVENTION

In accordance with the present invention, an isolator mount assembly generally includes a support structure, a device and isolator means disposed between the support structure and the device for reducing transmission of mechanical vibration energy therebetween. More specifically, the isolator means includes a plurality of canted coils interconnected with one another for causing the isolator means to exert a generally constant force in response to deflection of the spring assembly within a specific range along a loading direction due to mechanical vibration of one of the support structures and the device.

In addition, the isolator means in accordance with the present invention is operative for exerting a substantially greater force between the support structure and the device when the spring is deflected beyond the specific range hereinabove cited.

In this manner, the present invention is able to accommodate a high degree of deflection between the support structure and the device and thus is capable of absorbing vibration with a high degree of load tolerance and while providing significant overload protection against transient shock loads. As such, the canted-coil means in accordance with the present invention provides a combination of properties that is beyond those of the hereinbefore-described helical spring and the elastomeric isolator mounts or a combination thereof. This significantly distinguishes the present invention from prior isolator mounts, be they springs, elastomers or a combination thereof.

More specifically, the isolator mounts in accordance with the present invention may include a plurality of canted-coil means in which the substantially greater force exerted by the spring beyond the specific range is up to about eleven times greater than the generally constant force exerted by the canted-coil means in the specific range.

In addition, elastic material means may be provided and disposed around and between the plurality of coils for modifying an isolation efficiency of the isolator means. In this regard, the isolation efficiency may be considered equal to the difference between the dynamic input and the dynamic output divided by the dynamic input, the isolation efficiency being 100% when no transmission of vibrational energy there-past occurs, i.e., zero dynamic output.

In one embodiment of the present invention, the elastic material has a solid cross-section throughout the coil means which enables the substantially greater force to be about three times greater than the generally constant force.

In another embodiment of the present invention, the elastic material has a hollow cross-section in which case the substantially greater force is up to about seven times greater than the generally constant force.

Any of the hereinabove recited embodiments may be further characterized when the ends of the plurality of interconnected coils are joined in order to form a continuous coil spring, which may be circular or noncircular in configuration.

The present invention includes further embodiments in which the elastic material is either bonded or not bonded to the plurality of coils.

An additional important feature of the present invention, when the plurality of the interconnected coils have an elliptical shape, includes means for causing displacement, between the support structure and the device, to load the isolator means along a minor axis of the coils. Alternatively, means may be provided for causing displacement, between the support structure and the device, to load the isolator spring means along a major axis of the coils.

More specifically, the isolator means, when disposed between the support structure and the device, is operative for absorbing mechanical vibrational energy by way of a plurality of canted coils having a damping ratio of about 0.025 at the resonant frequency of the isolator means. In this embodiment, elastic material means may be provided and disposed around and between the plurality of coils for increasing the damping ratio. When the elastic material means has a solid cross-section, the damping ratio at the isolator spring moans resonant frequency is increased to about 0.2; and when the elastic material means has a hollow cross-section, the damping ratio at the isolator spring means resonant frequency may be increased to about 0.1.

In yet another embodiment of the present invention, similar isolator means with a plurality of canted coils and the elastic material, disposed around and between the plurality of canted coils, is provided for both reducing transmission of mechanical vibration between the support structure and the device and, importantly, for providing a pressure seal therebetween.

In operation, the isolator means in accordance with the present invention, as disposed between a support structure and a device, provides a means for absorbing mechanical vibrational energy, thus causing isolation of vibration and shock between the support structure and the device. The configuration of the isolator means includes a plurality of canted coils having an energy absorption factor of about two times the energy absorption factor of a helical spring having coils of substantially the same size and wire diameter as the plurality of canted coils.

In furtherance of the energy-absorbing capability of the isolator means, elastic material means may be provided which is disposed around and between the plurality of canted coils, for increasing the energy absorption factor. In the case of an elastic material means having a solid cross-section, the energy absorption factor, as compared to a helical spring, may be increased to about 3.5. In the case of an elastic material means having a hollow cross-section, the energy absorption factor, compared to a helical spring, may be increased to about 2.2.

BRIEF DESCRIPTION OF THE DRAWINGS

The advantages and features of the present invention will appear from the following description when considered in conjunction with the accompanying drawings in which:

FIG. 4 is a series of curves showing the force vs. deflection characteristics of the prior art elastomer shown in FIGS. 1 and 2 as well as the force/deflection characteristics of the isolator in accordance with the present invention shown in FIG. 3a;

FIG. 22 is a diagram illustrating typical dimensions of a canted-coil isolator in accordance with the present invention;

FIG. 23 is a force deflection curve for a canted-coil isolator axially loaded along the minor axis thereof while in a groove as illustrated in FIGS. 19a and 19b;

FIG. 24 is an illustration of the prior art helical spring isolator having essentially the same dimensions as the canted-coil isolator shown in FIG. 22;

DETAILED DESCRIPTION OF THE DRAWINGS

Figure 1:
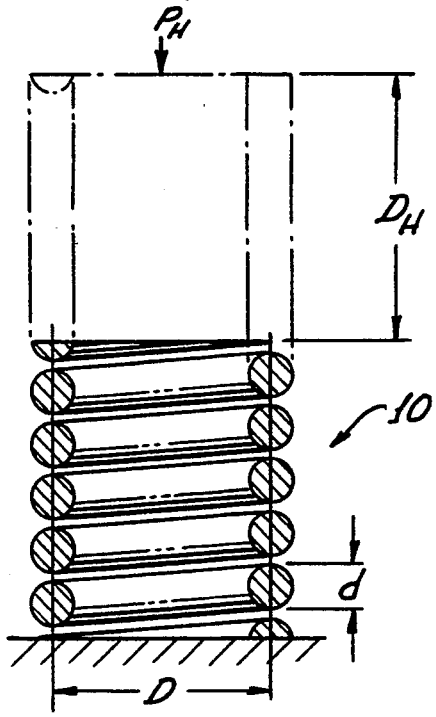
FIG. 1 is a cross-sectional representation of a prior art helical isolator spring showing the loading thereof.

As hereinabove discussed, prior art isolator devices have included a helical spring 10 shown in FIG. 1 and an elastomer 12 shown in FIG. 2, both being shown in a compressed position. In response to a force $P_H$, $P6_E$, the helical coil spring 10 and the elastomer 12 exhibit deformations $D_H$, $D_E$, respectively.

Figure 3A:
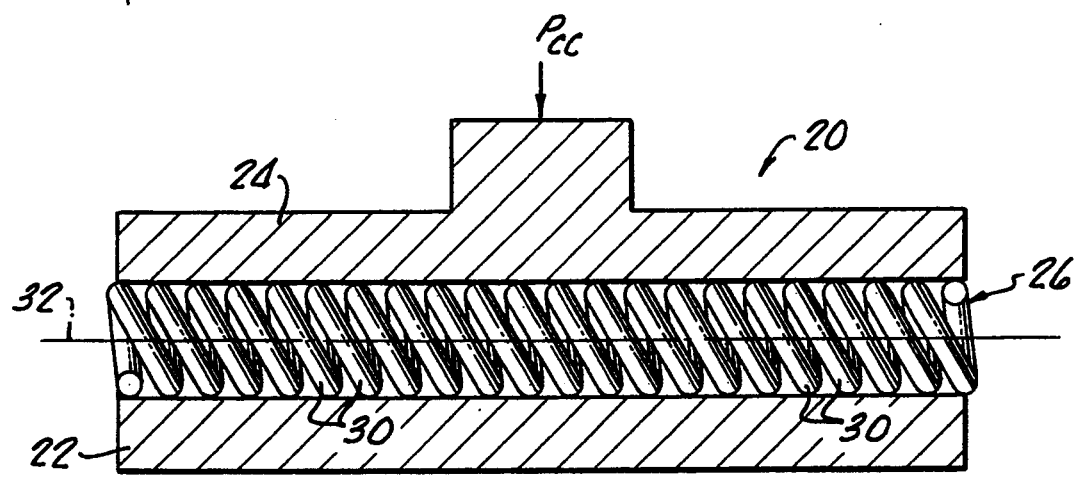
FIG. 3a is a representation of an isolator in accordance with the present invention which includes a plurality of canted coils and the manner of loading thereof.
Figures 3B, 3C:
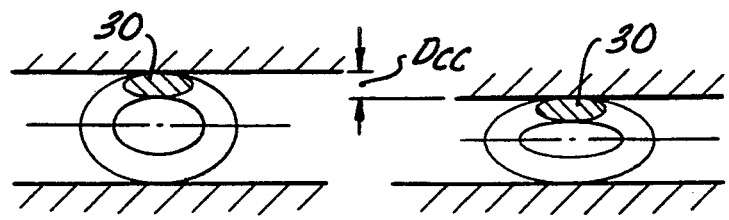
FIG. 3b is a side view of the isolator shown in FIG. 3a before loading thereof.
FIG. 3c is a side view of the isolator shown in FIG. 3a under load.

These structures will be compared to the isolator mount assembly 20 illustrated in FIG. 3a which generally includes a support structure 22 and a device 24. A force $P_{cc}$ generated by, for example, vibration of the support structure 22 or device 24 results in a deflection $D_{cc}$ of the isolator 26, the deflection more clearly being shown in FIGS. 3b and 3c.

As hereinafter described in greater detail, the isolator, when disposed between the support structure 22 and the device 24, is operative for reducing transmission of mechanical vibration therebetween. It should be appreciated that the structure 22 as shown is representative of any type of structure such as a wall, a bracket or any other base or apparatus for supporting the equipment 24 which may be, for example, a motor, a pump, instrument, or any electronic equipment.

As hereinafter described in greater detail, the isolator 26 generally includes a plurality of canted coils 30 interconnected with one another in a manner for causing the isolator 26 to exert a generally constant force in a loading direction $D_{cc}$ approximately normal to the center line 32 of the coils 30 in response to a deflection from the coils within a specific range along the loading direction due to mechanical vibration generated by either the support structure 22 or the equipment 24.

Figure 4:
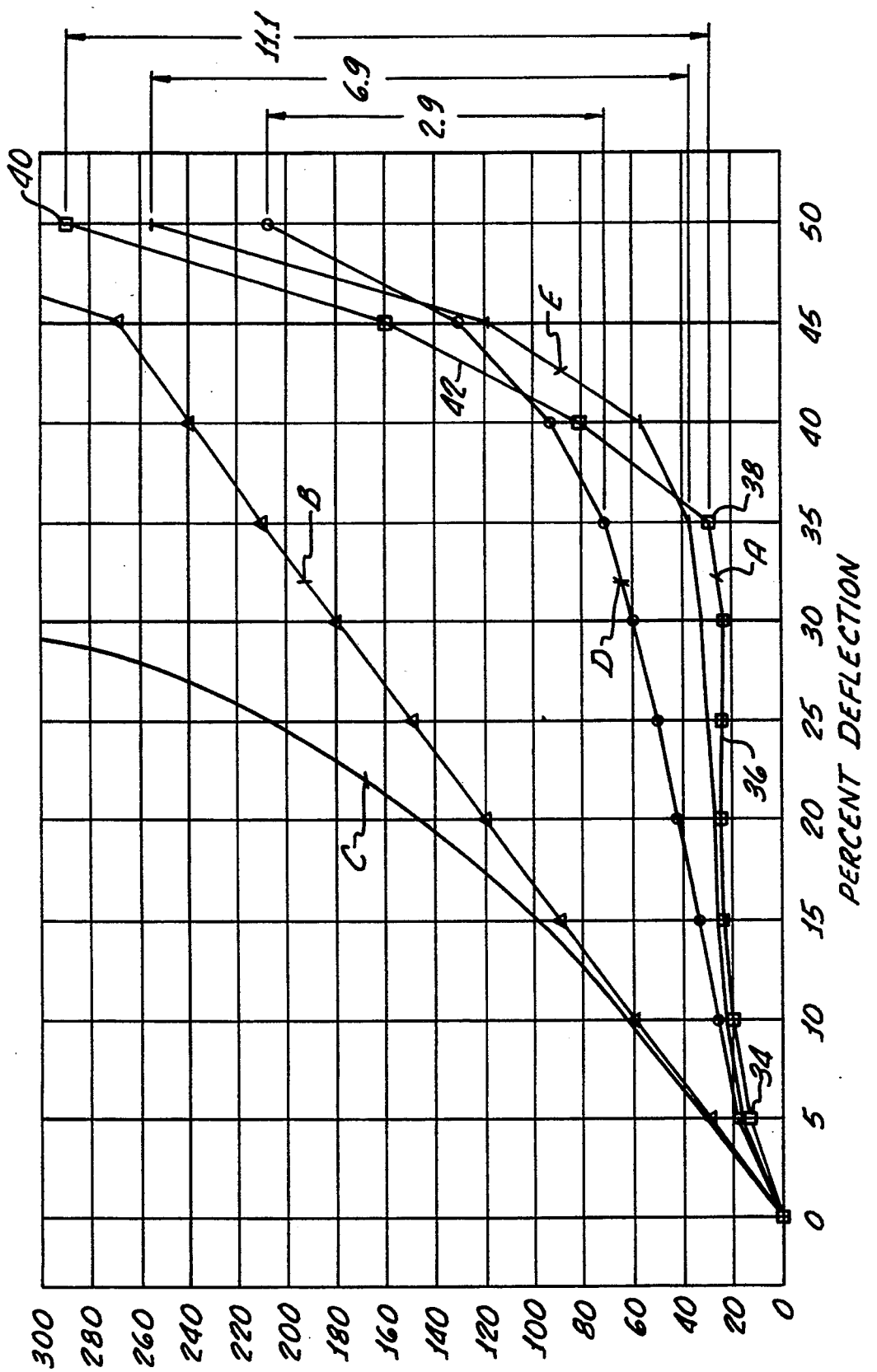

In addition, the coils 30 cause the isolator 26 to exert a substantially greater force when the coils are deflected beyond the specific range. Typical force/deflection characteristics of the isolator mount assembly 20 in accordance with the present invention are shown in FIG. 4 as curve A. When the coils 30 are elliptical in shape as more clearly shown in FIG. 3b, the loading thereof may be along either the minor or the major axis thereof as will be hereinafter described in greater detail. In either case, the shape of the force/deflection characteristics of the coil is generally as shown by curve A in FIG. 4, where it can be seen that after an initial working deflection 34, the force is constant throughout additional deflection in a working range 36 between the point of initial working deflection 34 and a point 38 at which the coils abut. After this working deflection range, or static lead range 36, the force/deflection of the isolator 26 is nonlinear until it reaches a maximum useful deflection point 40. The substantially increased force within the deflection range 38 and 40 represents an overload protection range 42 and the area beneath curve A from points 38 to 40 represents an overload capacity area. As shown in FIG. 4, the canted-coil spring isolator 26 provides a static overload factor of approximately 11.1 (the significance of this factor will be hereinafter discussed in greater detail). It should be appreciated that while the isolator 26 shown in FIG. 3a is linear, it could be joined to assume a circular configuration.

As a comparison, a typical force vs. deflection curve for a helical spring-type isolator 10 is shown as curve B in FIG. 4. As shown by curve B, the force vs. deflection characteristic remains relatively proportional, or linear, to about 45% deflection and thereafter, the force increases very sharply with deflection. However, it should be noted that further deflection usually results in permanent fatiguing of the helical coil spring 10, meaning that the spring will not return to its original height upon removal of the load.

Figure 2:
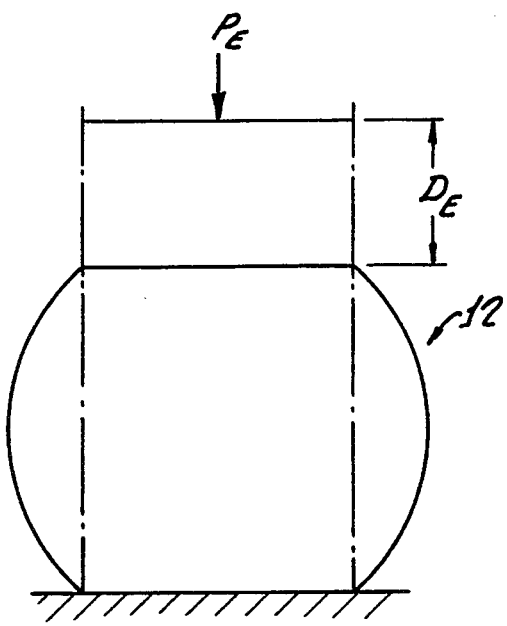
FIG. 2 is a side view representation of an elastomeric isolator in accordance with the prior art showing deformation under load.

Curve C in FIG. 4 is a typical force vs. deflection curve for an elastomer isolator 12 which, under actual load as shown in FIG. 2, has a force vs. deflection curve which is parabolic beyond a relatively linear range to about 25% deflection. It can be seen that beyond that deflection, the load increases very sharply. Unfortunately, elastomers are typically not used in compression with deflections greater than 15% because of the tendency of the elastomer to creep and cause strain fatigue failure.

Comparison of curves A, B and C demonstrates that the canted-coil isolator 26 of the present invention provides a significantly improved overload factor which provides significant overload protection against transient shock loads.

Figure 5:
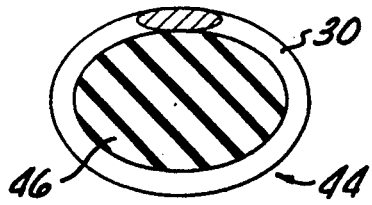
FIG. 5 shows a cross-section of a canted-coil spring filled with a solid elastomer in accordance with the present invention.
Figure 6:
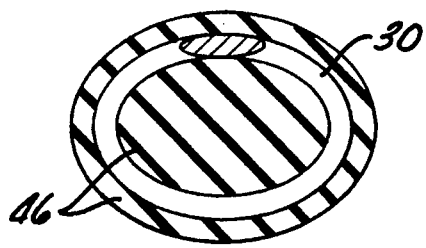
FIG. 6 is a cross-section of a canted-coil spring filled with an elastomer which extends beyond the outside diameter of the elastomer in combination with the canted-coil spring.

Alternative embodiments 44, 46 of the present invention are shown in FIGS. 5 and 6 respectively, in which an elastic material 46 is disposed around and between the coils 30. As shown in FIGS. 5 and 6, the embodiments 44, 46 include an elastomer with a solid cross-section in the interior of the coils. Elastic material 46 may, as shown in FIG. 6, extend exterior to the coils 30. The elastic material 46 may be bonded to the coils 30 or formed around the coils without being bonded thereto. Any suitable elastomeric material, plastic, paste may be utilized in conjunction with the coils, but preferably when materials such as silicon RTV 732, available from Dow Corning, are used. In situations where the elastic material 46 is bonded to the coils, the coils 30 may be treated in any well-known manner such as etching or precoating the coils to ensure bonding of the elastomer 36, 32. Alternatively, if no surface preparation is done or a suitable nonbonding material is applied to the coils before application of the elastomer 46, the latter is merely formed thereabout without significant bonding thereto.

Returning now to FIG. 4, there is shown a typical force vs. deflection curve for an isolator 44, 46, shown as curve D. As can be seen from curve D, the force developed by the solid elastomer-filled coil 30 is not as constant within the working deflection as is the coil alone represented by the curve A. At approximately 35% deflection, the force increases gradually and the difference between the force developed within the working deflection and the maximum load, at 50% overload protection range, is only at 2.9 compared to the 11.1 for this spring alone. Thus, the addition of the elastomer 46 to the coils 30 affects the performance of the isolator 26 by substantially reducing the deflection and the overload protection that the coils 30 alone offer. However, as hereinafter described in greater detail, other advantages are derived by increasing the damping and lowering the transmissibility of the isolator 44, 46.

Figure 7:
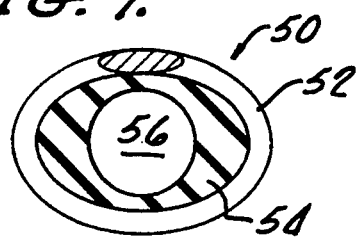
FIGS. 7-13 are various configurations of the present invention showing variations of the arrangement of the elastomer canted-coil springs.

Yet another embodiment 50 of the present invention as shown in FIG. 7 of the cross-section includes coils 52 and elastomer 54 within opening 56 thereby providing the elastomeric material 54 with a hollow cross-section.

Curve E in FIG. 4 shows a typical force vs. deflection characteristic or curve for the isolator 50. As can be seen, the force vs. deflection remains relatively constant within the working deflection and thereafter, the force increases very sharply, providing a high degree of optimal protection. In this instance, the difference between the static load range and the maximum overload range at 50% deflection is 6.9. From the characteristic curve E, it can be determined that the isolator 50 provides a higher static force and in addition, the overload protection rises very gradually. However, such overload protection is not as large as that provided by the spring isolator 26 alone. In both the embodiments 44 and 50 utilizing a combination of a coil 30, 52, and elastomer 46, 54, the spring is filled with a Dow Corning 730 elastomer with the elastomer 46, 54 being bonded to the coils 30, 52 respectively. In additional, all of the force vs. deflection characteristics shown for the isolators 26, 46, 50 are directed to a canted-coil isolator in the length which is loaded along the minor axis thereof as will be described hereinafter in greater detail.

Figure 8:
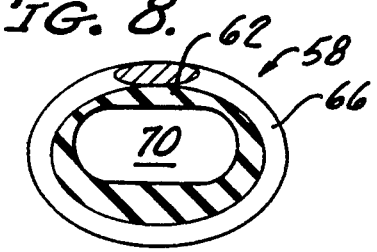
Figure 9:
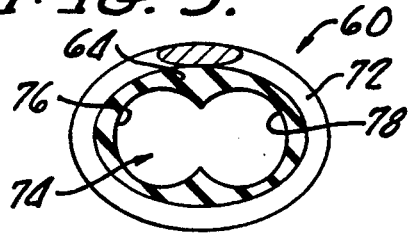
Figure 10:
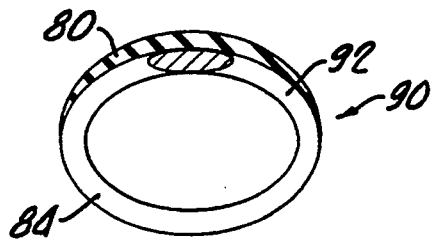
Figure 11:
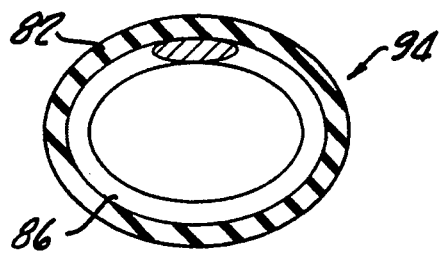

Other embodiments 58, 60 having a hollow elastomer 62, 64 shown in FIGS. 8 and 9, in FIG. 8, coils 66 are elliptical with an offset, or generally rectangular, hollow cross-sectional opening 70 therethrough, while FIG. 9 shows elliptically shaped coils 72, the elastomer 64 having an irregularly shaped opening 74, comprising two generally circular cross-sectional areas 76, 78. In FIGS. 7, 8 and 9, the elastomers 54, 62, 64 are shown in the interior of the coils 52, 66, 72. Alternatively, as shown in FIGS. 10 and 11, elastomers 80, 82 may be disposed exterior to coils 84, 86, respectively. And, in the case of embodiment 90, shown in FIG. 10, the elastomer 80 may be disposed on one side 92, thus providing an asymmetric distribution of the elastomer 80 with respect to the coils 84.

Figure 12:
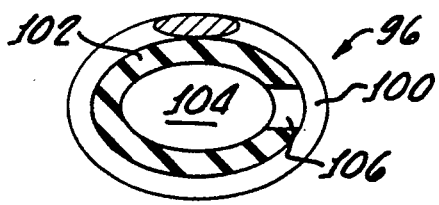
Figure 13:
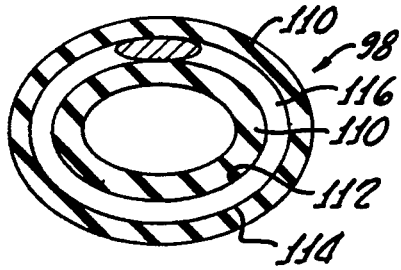

Further embodiments 96, 98 of the invention are shown in FIGS. 12 and 13 which, in the case of isolator 96, include coils 100 having internal elastomer 102 with an elliptical hollow center 104, along with an opening 106 through the elastomer 102 to facilitate the passage of fluid (not shown) for pressure variation, cooling or lubrication.

As can be seen from FIG. 13, the elastomer 110 may be disposed on both the inside 112 and outside 114 of the coil 116. All of these embodiments differently affect the force/deflection characteristics of the isolator 50, 58, 60, 90, 94, 96 and 98.

Figure 14A:
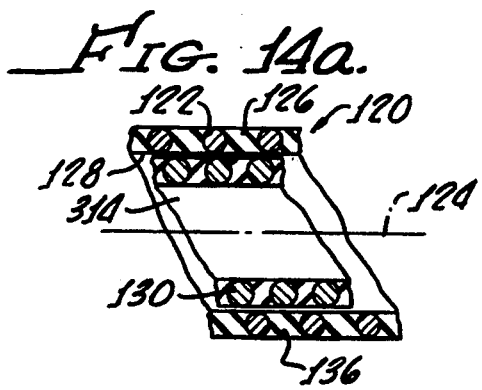
FIGS. 14a and 14b illustrate the features of the present invention in which two canted coils are utilized with the coils being canted in the same direction.
Figure 14B:
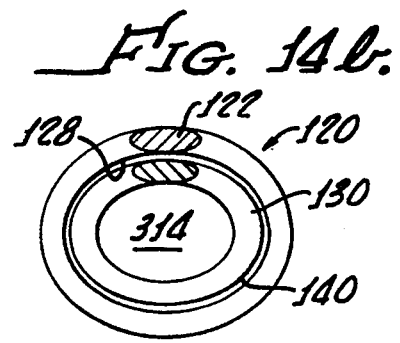

Turning to FIGS. 14a and 14b, there is shown an alternative embodiment of an isolator 120 which includes a first plurality of coils 122 interconnected with one another in a spaced-apart relationship, for causing the isolator 120 to exert a generally constant force in a loading direction perpendicular to the center line 124. As hereinbefore described in connection with the plurality of coils 30, an elastic material 126 may be disposed around and between the plurality of coils 122, which has a hollow cross-section 128 to provide means for modifying the force exerted by the isolator 120 in response to deflection of the isolator 120 along the loading direction as hereinbefore described.

Disposed within the plurality of coils 120 is a second plurality of coils 130 interconnected with one another in a spaced-apart relationship and disposed in a cooperating relationship inside the first plurality of coils 122 for causing the isolator 120 to exert a generally constant force in a loading direction approximately normal to the center line 124.

Elastomer, or elastic material, 136 may be disposed around and between the plurality of coils 130 with a hollow cross-section 314. FIG. 4b shows a cross-sectional view of the isolator 120 and also shows that the elastic materials 126, 136 may be separate from one another with a gap 140 therebetween to allow relative movement therebetween as the isolator 120 is loaded.

Figure 15A:
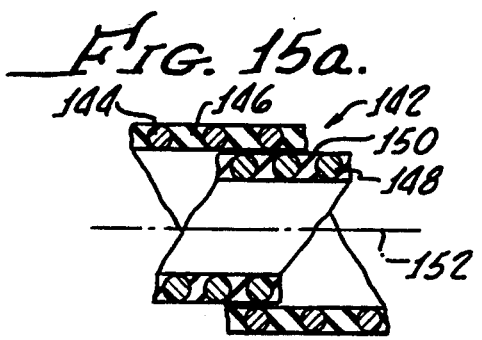
FIGS. 15a and 15b illustrate a two-coil isolator in accordance with the present invention in which the coils are canted in opposite directions.
Figure 15B:
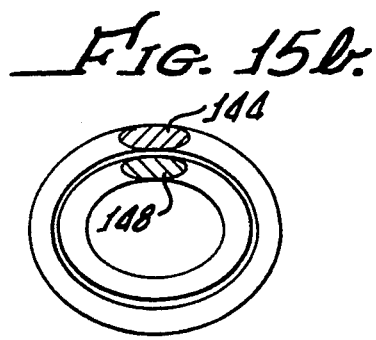

Similar to isolator 120, isolator 142, as shown in FIGS. 15a and 15b, includes a first plurality of coils 144 with elastic material 146 and a second plurality of coils 148 with elastic material 150 disposed inside the first plurality of coils 144.

The configuration of the first and second plurality of coils 144, 148 and elastic material 146, 150 is similar to the isolator 120 shown in FIGS. 14a and 14b except that the first plurality of coils 144 is canted in an opposite direction of the second plurality of coils 148, along the center line 152.

FIG. 15b shows the isolator 142 in cross-section.

Figure 16A:
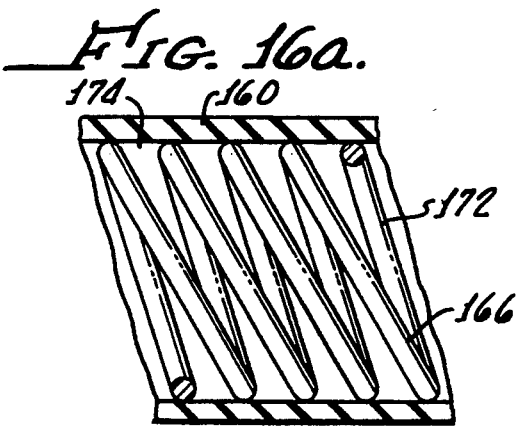
FIGS. 16a–16d are side views showing a cross-section showing the relative displacement of the elastic material with canted coils in accordance with the present invention.

Further illustration of the various positions of elastomer 160, 162, 164, 165 and coils 166, 168, 170, 171 is shown in FIGS. 16a, 16b, 16c, and 16d. As shown in FIG. 16a, the elastomer 160 is in the form of a tube in which the coils 166 are inserted.

Alternatively, the elastomer, or plastic material, 160, 162, 164, 165 may be molded or extruded upon coils 160, 168, 170, 171. In the embodiment 172 shown in FIG. 16a, the elastomer 160 does not penetrate spaces 174 between the coils 166.

Figure 16B:
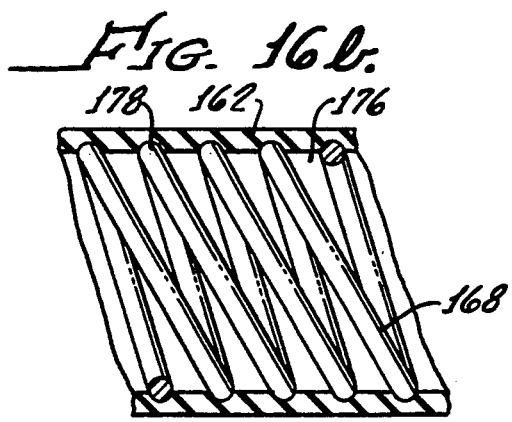
Figure 16C:
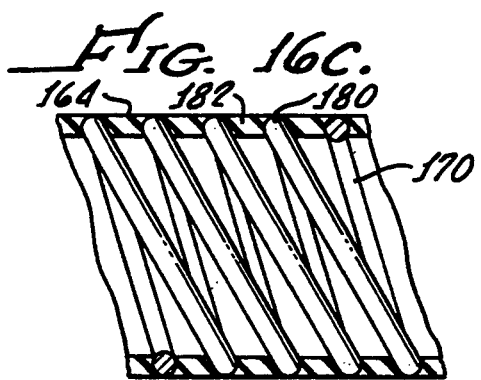
Figure 16D:
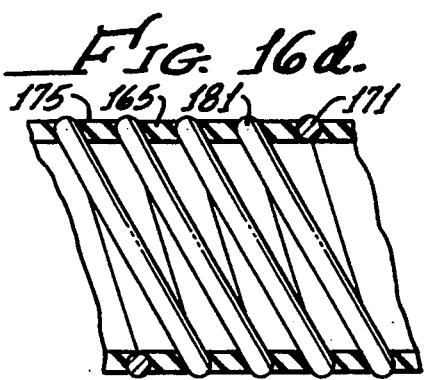

As shown in FIG. 16b, however, the elastomer 162 partially fills the spaces 176 between the coils 168 to a point below the top 178 of the coils 168. Alternatively, as shown in FIG. 16c, the elastomer 164 may be flush with an outside 180 of the coils 170 and fill spaces 182 between the coils 170. The elastomer 165 shown in FIG. 16d fills spaces 175 between the coils 171 while exposing the outside 181 of the coils 171. This configuration enables the elastomer 165 to move or flow upon compression of the coils 171 until the elastomer is flush with the outside 181 of the coils (such as shown in FIG. 16c not under compression) in order to provide direct coil contact with the support structure and device (not shown in FIG. 16d) and still provide a low pressure environmental seal (up to 5 psi).

Figure 17:
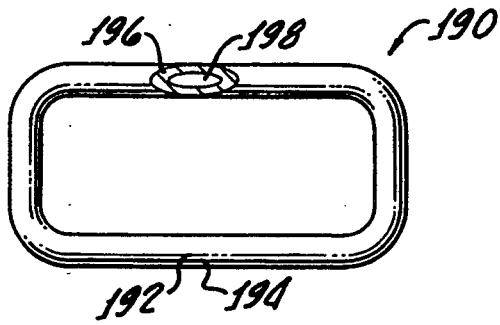
FIG. 17 is an illustration of continuous noncircular canted-coil isolator in accordance with the present invention.

The isolator 130 may be linear. However, as shown in FIG. 17, the isolator 190 may have ends 192, 194 joined so as to form a continuous isolator. This is diagrammatically shown in FIG. 17 where the isolator 190 has a generally rectangular shape with an elastomer 196 having a hollow cross-section 198. As hereinafter described, the isolator 190 may also assume a circular shape by way of original manufacture, or by assembly in a circular configuration as hereinafter described in greater detail.

Figure 18A:
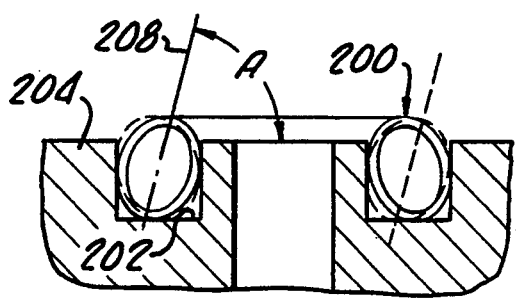
FIGS. 18a and 18b show the loading of the canted-coil elastomer along the major axis thereof, utilizing a groove in accordance with the present invention.
Figure 18B:
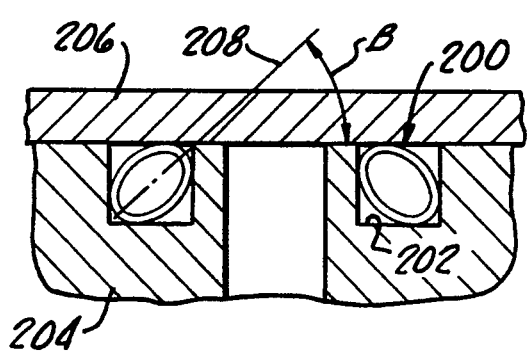

An isolator 200 in circular form is shown in FIGS. 18a and 18b. In this instance, a groove 202 disposed in a support structure 204 provides means for supporting the isolator with an assembly turn angle A of approximately 70° for causing a loading of the isolator 200 by a device 206 (FIG. 18b) generally along a major axis 208 thereof. Loading of the isolator 200 establishes a load turn angle B of about 40°. It should be appreciated that while an assembly turn angle of about 70° and a load turn angle of about 40° are shown in FIGS. 18a and 18b, other angles of assembly up to 90° and load may be utilized depending on the isolator application and configuration. For example, although FIGS. 18a and 18b show the isolator 200 assembled in the cavity 202 having a groove width larger than the coil height, but smaller than the coil width, and forming an assembly turn angle less than 90°, the cavity 202 may have a groove width equal to or smaller than the coil height. In such case, upon assembly of the isolator into the cavity 202, it will assume a 90° assembly turn angle.

When the groove width is larger than the isolator coil height, but smaller than the coil width, a radial spring cannot be used, and an axial spring must be used so that upon assembling the spring in the cavity, the coils will be deflected along the minor axis to retain the spring into such cavity. Under such circumstances, the assembly turn angle will be less than 90° (preferably 70°). Although the preferred method is the one described, i.e., using an axial spring, a radial spring can also be used. However, the radial spring will not work as well because of its tendency to spike and fatigue.

Although not shown in FIGS. 18a and 18b, the isolator 200 may be disposed in a groove (not shown) in the device 206 rather than the support structure 204 with similar results. It should be appreciated that, as shown in FIGS. 18a and 18b, with an assembly turn angle A of 70°, the isolator 200 assumes a "cone" shape as shown in dashed lines. In FIG. 18a, the isolator 200 may also be disposed in a groove 202 so that it assumes an "inverted cone" configuration.

Figure 19A:
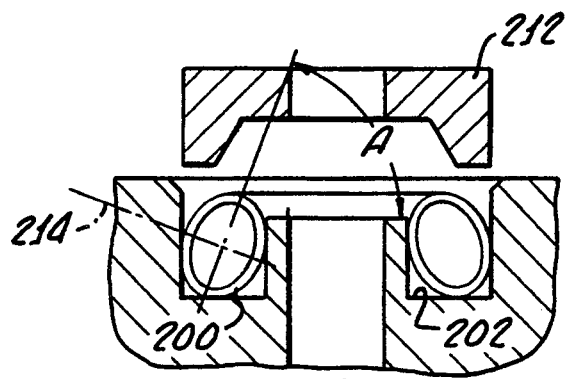
FIGS. 19a–19c illustrate the canted-coil elastomer in accordance with the present invention along with a wedge for enabling loading of the canted-coil elastomer along a minor axis thereof.
Figure 19B:
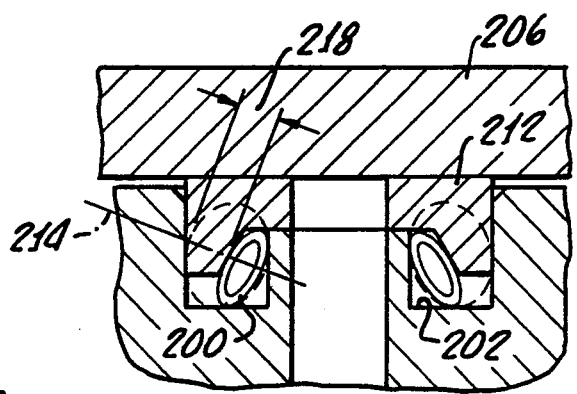

Alternatively, as shown in FIGS. 19a and 19b, a wedge 212 may be provided which in cooperation with the groove 202, provides a means for causing loading of the isolator 200 along a minor axis 214 thereof. In this case the device 206 acting against the wedge 212 causes deflection 218 along the minor axis 214 as more clearly shown in FIG. 19b.

Figure 19C:
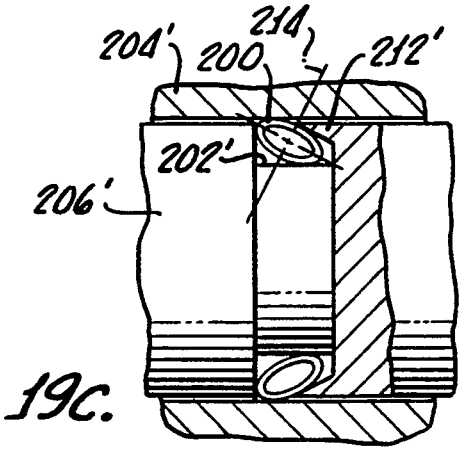

FIG. 19c represents another embodiment of the present invention in which the isolator 200 is supported in a groove 202 in a cylinder 206 for reducing transmission of mechanical vibrational energy between the cylinder or device 206' and a support structure 204', a wedge 212', which is an integral part of the cylinder 206', provides loading minor axis 214 of the isolator 200.

Figure 20:
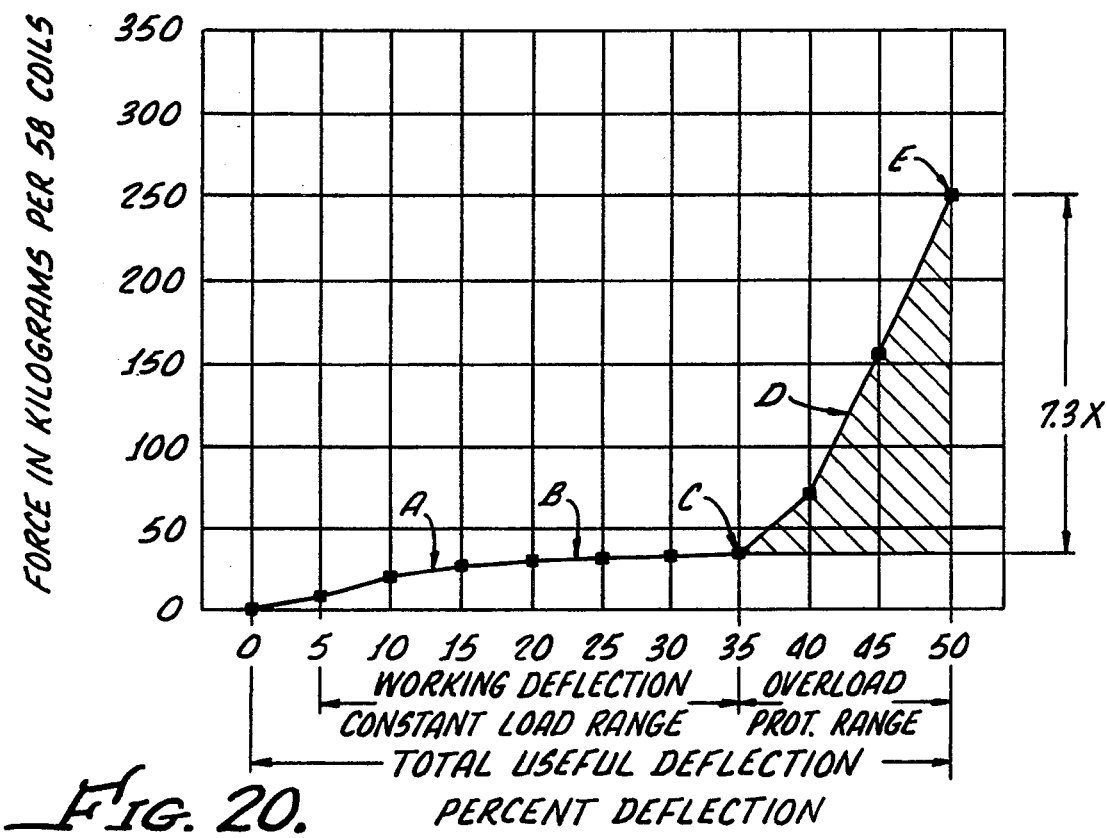
FIG. 20 is a force deflection curve for a canted-coil isolator in accordance with the present invention loaded axially along the major axis thereof.
Figure 21:
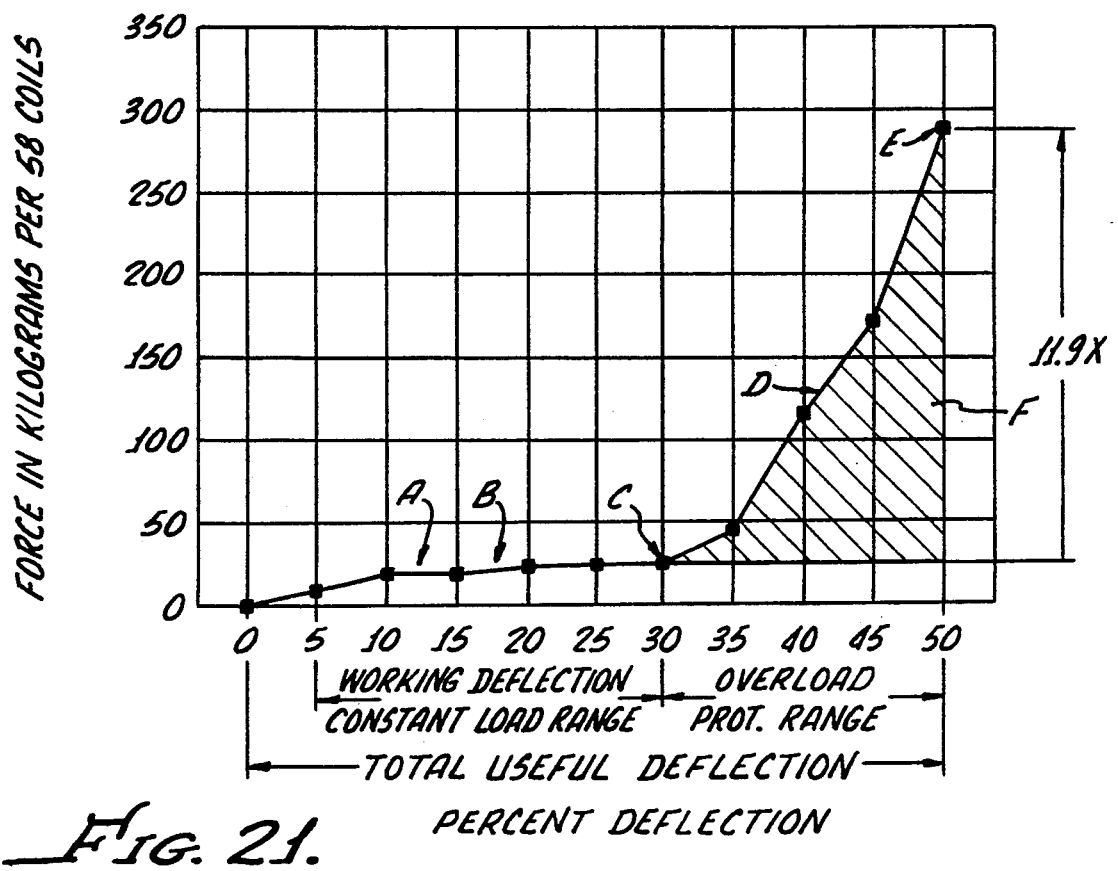
FIG. 21 is a load deflection curve for a canted-coil isolator loaded axially along the minor axis thereof.

FIGS. 20 and 21 show the load, or force vs. deflection, curves for the isolator 200 when loaded as shown in FIG. 3a along the major axis and when loaded along the minor axis, respectively.

The mechanical characteristics of the isolator 200 are illustrated in FIG. 22 which shows the plurality of coils 220 formed from wire having a diameter C of 0.022 inches, a coil height D of 0.162 inches, a pitch E of 0.046 inches, a front angle F of 30°, and a back angle G of 14°. The width of the coils 220, taken along the major axis 208 (see FIG. 18a), is 0.174 inches. The curve A in FIG. 20 shows a nearly constant region B until an initial butt point C followed thereafter by a non-linear curve D to butt point E (maximum useful deflection). As shown in FIG. 20, the working deflection, or constant load range, is between 5% and 35% with a total useful deflection between 0% and 50%. The area F under the curve portion E from the initial butt point C to the butt point at maximum useful deflection E represents the overload capacity area of the isolator which has an overload protection factor of up to 7.3.

The force or load vs. deflection curve for isolator 200 when loaded along the minor axis, as shown in FIGS. 3a and, 3c, is shown in FIG. 21. The corresponding portions of the curve shown in FIG. 21 are identified to the corresponding portions of the curve shown in FIG. 20. Unexpectedly, a greater overload protection is provided when the isolator is loaded along the minor axis as shown by the area F under the curve section D and an overload protection factor of 11.9. This is an important consideration since the same size spring can result in higher energy storage capacity.

FIG. 23 shows the load vs. deflection curve for the isolator 200, when axially compressed by the wedge 212 in the groove 202 as shown in FIG. 19b. Accordingly, the isolator 200 is loaded generally along the minor axis. Corresponding portions of the curve in FIG. 23 correspond to similar portions of the curve shown in FIGS. 20 and 21 with an overload protection factor of 3.6.

Figure 25:
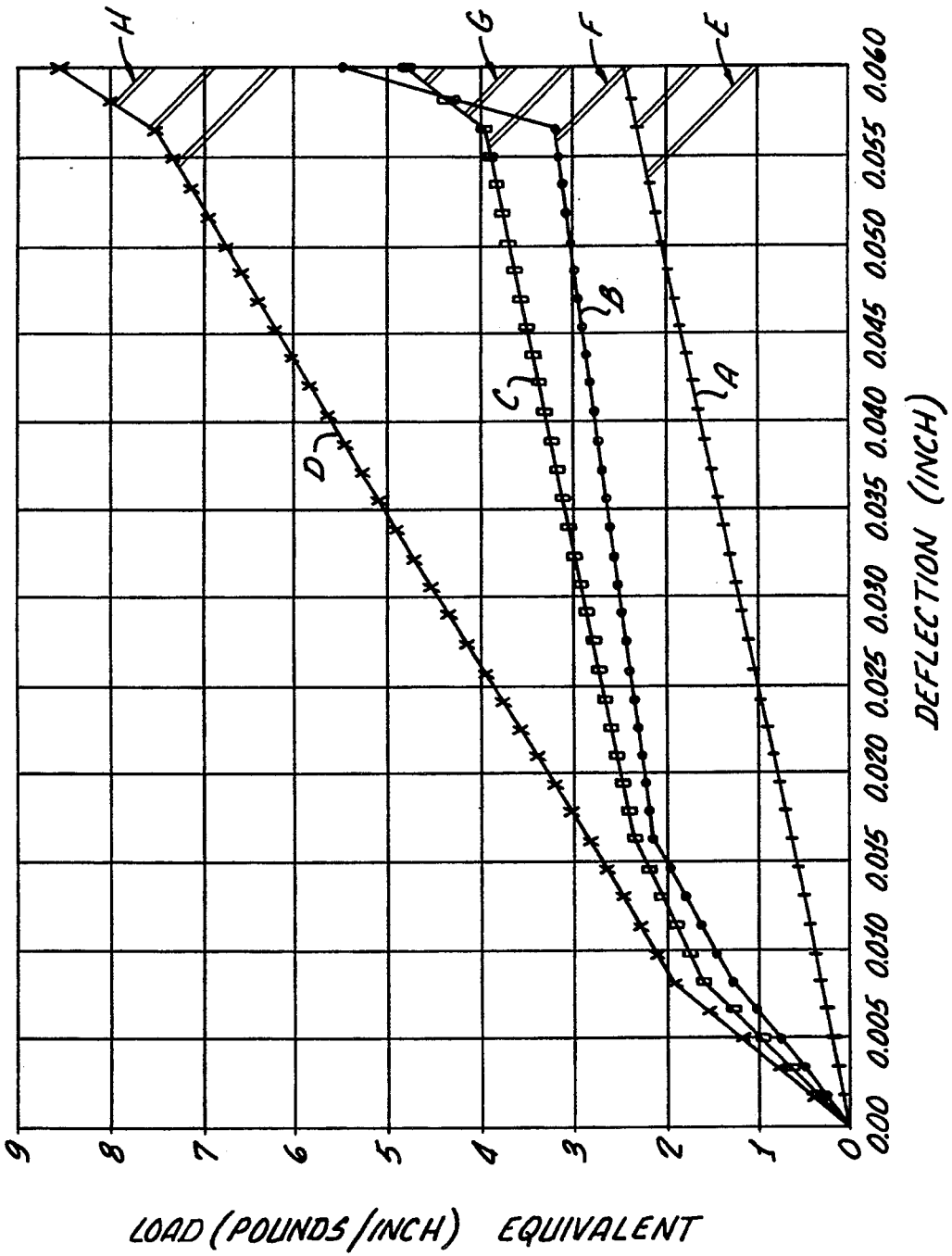
FIG. 25 is a summary of lead deflection characteristics of isolators of the present invention compared to those of the prior art.

For comparison with helical-type springs, a helical spring 240, as shown in FIG. 24, was constructed with the same wire size C of 0.022 inches, outside diameter D of 0.0162 inches, pitch E of 0.046 inches. A force deflection curve for the helical spring 240 is shown in FIG. 25 as curve A along with the corresponding load deflection curve for the isolator 200, unsupported by a groove, shown as curve B. Also shown as curve C is the force deflection curve for the isolator 200 when filled with an elastomer (hollow cross-section) as shown in FIG. 12. Curve D in FIG. 25 represents the force deflection curve for the isolator 200 filled with the elastomer having a solid cross-section such as shown in FIG. 5. The areas underneath these curves E, F, G, H, respectively, represents the energy storage capacity for isolaters.

Table I shows the relative energy absorption factor between the helical coil isolator and the canted-coil isolaters.

TABLE I

| Spring Type | Area under the Curve in FIG. 25 | Energy Absorption Factor |
|---|---|---|
| Helical Coil | 0.0735 | 1.00 |
| Canted-Coil Only | 0.1416 | 1.93 |
| Canted-Coil Hollow | 0.1649 | 2.24 |
| Canted-Coil Solid | 0.2630 | 3.58 |

As can be seen from Table I, the canted-coil isolaters of the present invention are for substantially higher storage capacity than afforded by a helical coil isolator of the same size.

The effectiveness of any isolator is determined by a number of factors such as: the energy absorption capacity, the transmissibility, the natural frequency of the isolator, the damping ratio or fraction of critical damping, and the isolation frequency, among other factors.

Figure 26:
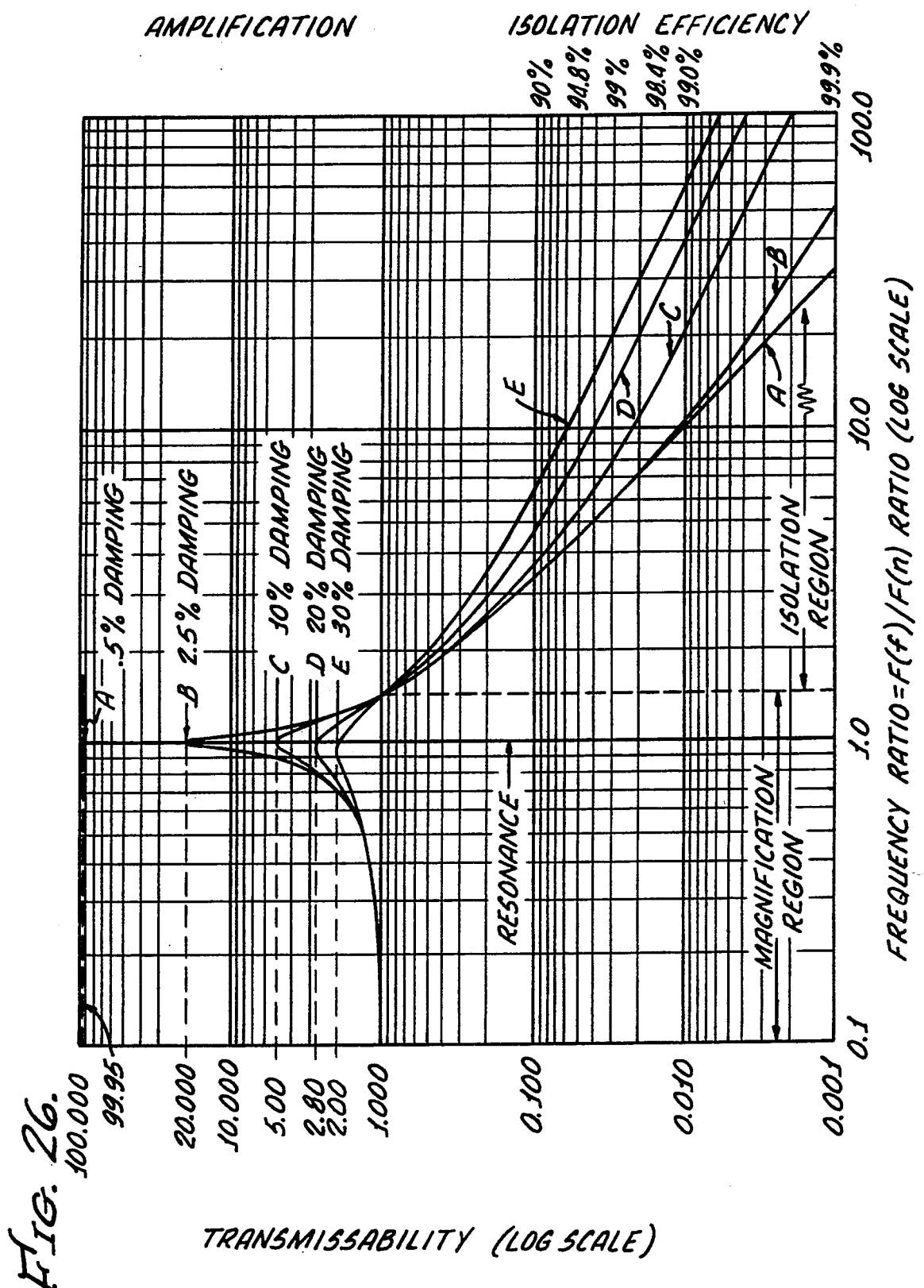
FIG. 26 is a comparison of the transmissibility vs. frequency ratio of isolators of the present invention compared to prior art isolaters.

FIG. 26 shows the transmissibility as a function of frequency ratio and isolation efficiency for a helical coil isolator, a canted-coil isolator, a hollow elastomer-filled canted-coil isolator, a solid elastomer-filled isolator, and a plain elastomer isolator as curves A, B, C, D and E, respectively.

Two factors affecting isolation efficiency are the natural frequency and damping of the isolator. The natural frequency is the rate of free isolation over a period of time, and damping is the characteristic which dissipates energy in a dynamic system.

The frequency ratio, $F(f)/F(n)$, the frequency imposed upon the system divided by the natural frequency, is used to determine the isolation efficiency of any isolation system. In FIG. 26, the plot of isolation efficiency shows that when the ratio $F(f)/F(n)$ is less than $\sqrt{2} = 1.414$, the curves are in the magnification region. When the forcing frequency is equal to the natural frequency of the isolator, i.e., $F(f)/F(n)$, the maximum magnification occurs. At ratios above 1.414, the curves are in the isolation region. Typically, isolators which exhibit the greatest magnification at resonance have the best isolation efficiency as shown by curve A in FIG. 26, representing the helical coil spring isolator. However, in general, low amplification at resonance is desire as is shown by curves B, C, D, and E. representing canted-coil isolators and plain elastomer isolators.

$C/C_c$ represents the damping ratio and, as shown in FIG. 26, it can be seen that isolators with small $C/C_c$ values provide an excellent isolation efficiency but produce high transmissibility at resonance. Conversely, isolators with large $C/C_c$ values do not provide as excellent an isolation frequency but transmissibility at resonance is reduced.

In terms of the comparison at hand, it can be seen that a helical coil isolator with low damping ratio at resonance creates a very high isolation frequency, but on the other hand, a plain elastomer isolator creates low isolation efficiency.

The solid, elastomer-filled canted-coil isolator has a damping ratio of $C/C_c$ of 0.200 which results in a 20% damping efficiency and a transmissibility of 2.8. An elastomer-filled, hollow canted-coil isolator damping ratio is 0.1 or 10% damping efficiency which results in a transmissibility of 5.0. The damping ratio for the canted-coil isolator without elastomer has a damping ratio of $C/C_c$ 0.025 which results in a damping efficiency of 2.5 and a transmissibility factor of 20. Thus, the canted-coil spring isolator has a frequency ratio of 8 and isolation frequency of 94.4.

An advantage of the present invention is the capacity of the isolator to be adapted to desired transmissibility and isolation efficiencies, depending upon the application. This has not been available with heretofore helical springs and solid elastomer isolators.

It is the unique feature of the canted coils of the present invention to exhibit initially low force deflection curves enabling the synergistic combination of an elastomer and canted coils. The combination of an elastomer with a helical spring to form an isolator is without advantage because both exhibit very high linear to parabolic force deflection characteristics as shown in FIG. 4. Hence, it is not possible to combine with the helical coil spring an elastomer and achieve a lower force deflection than the helical spring itself, while at the same time providing high overload protection. These advantages are afforded by the combination of the elastomer and the canted-coil spring.

Another important factor in the determination of isolator efficiency is the ability of an isolator to limit the amplitude displacement thereof over a period of time as a function of displacement of the isolator. Also important is the time required for equilibrium to be restored after an initial vibration.

Figure 27:
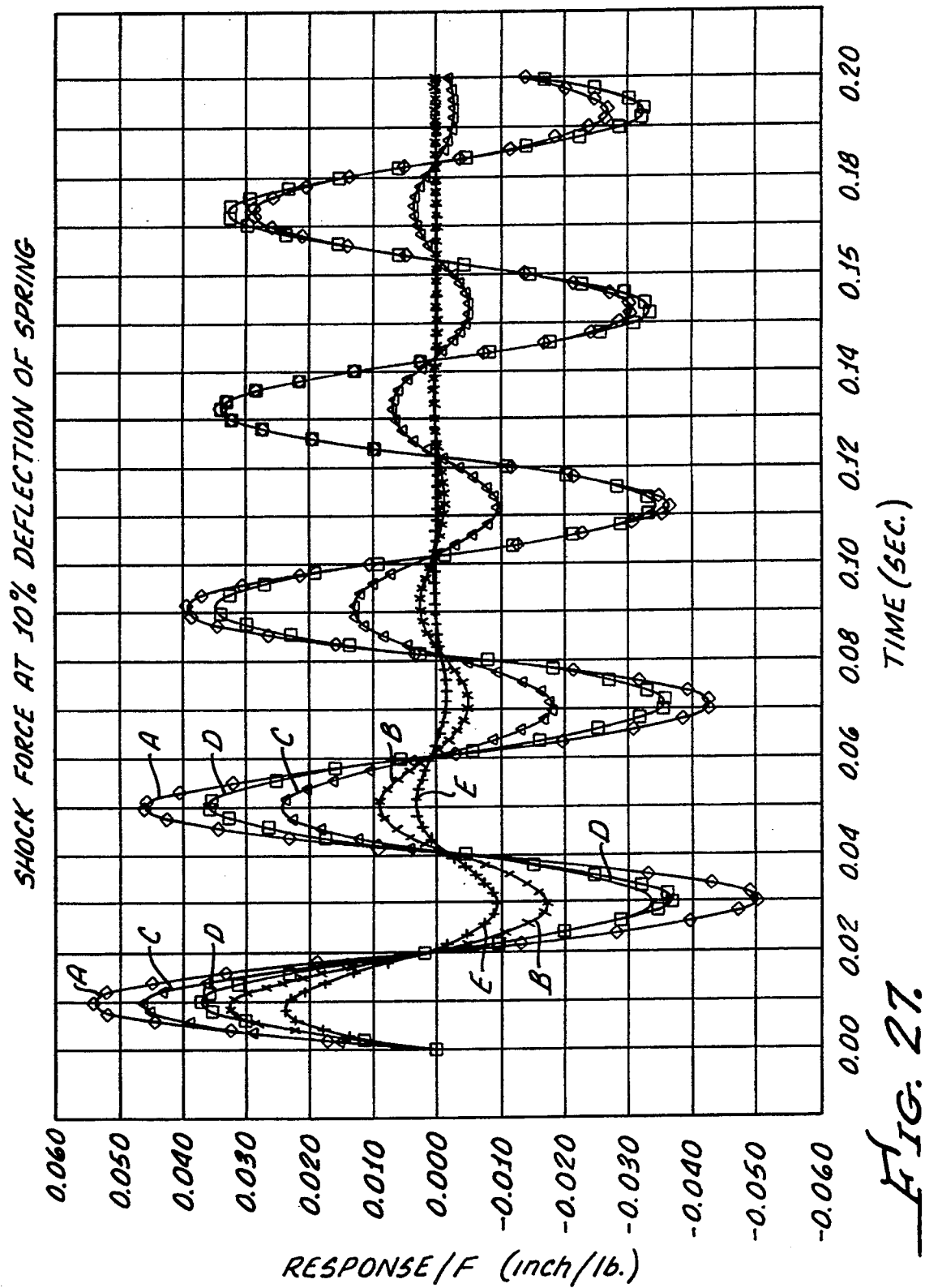
FIGS. 27-29 are displacement vs. time of isolators of the present invention compared to prior art isolators.
Figure 28:
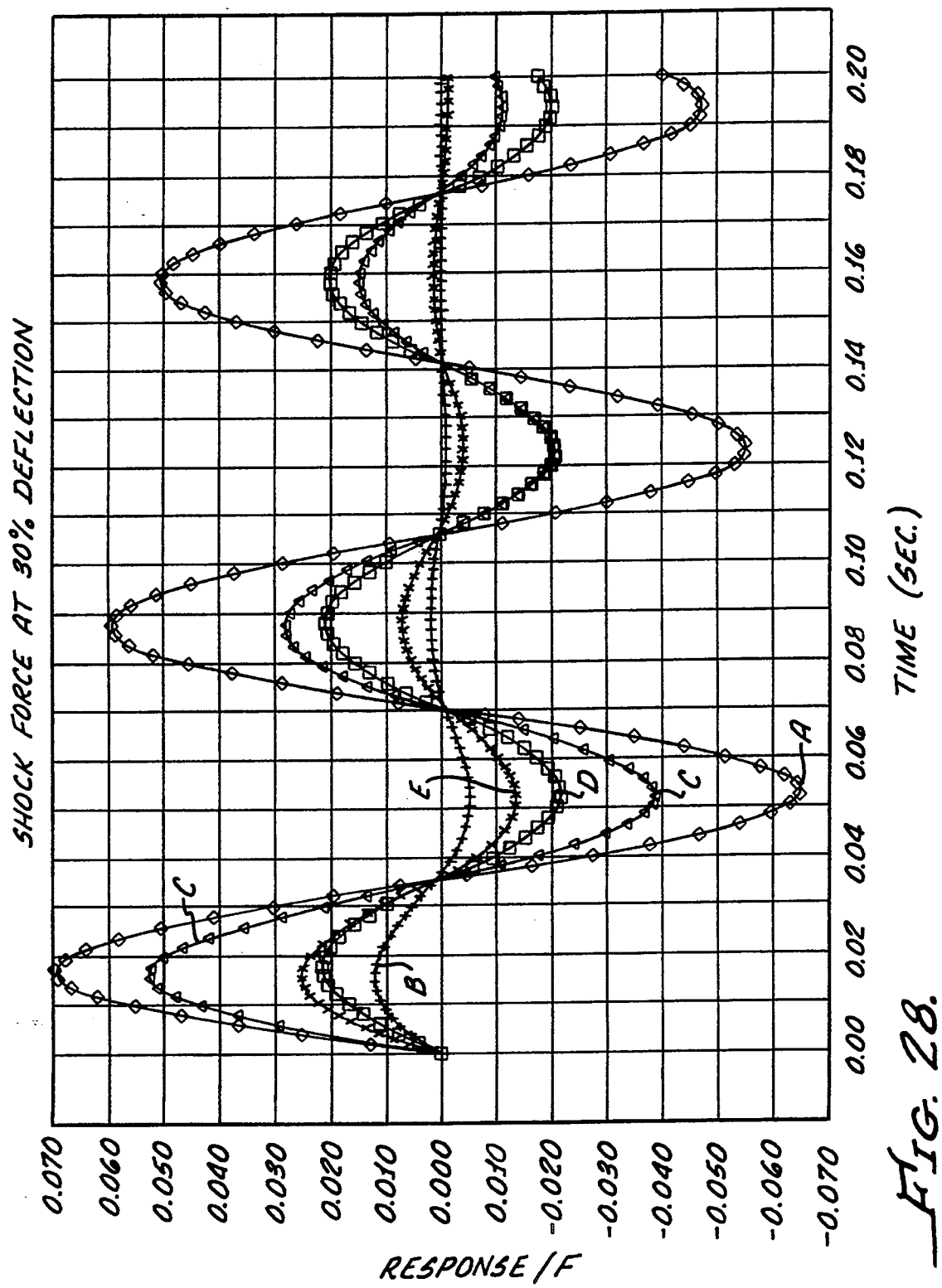
Figure 29:
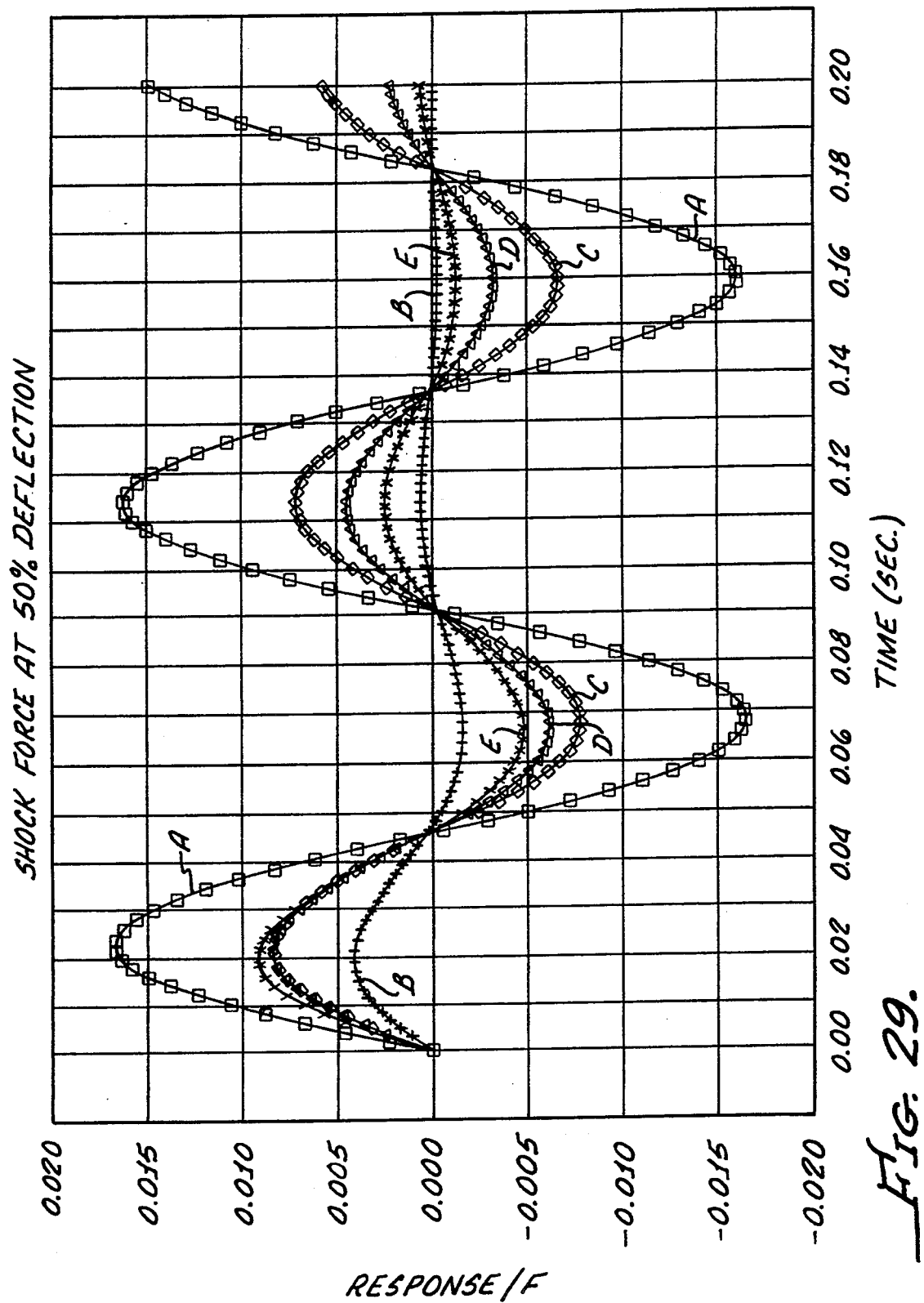

FIGS. 27, 28 and 29 show the displacement in inches upon application of a one-pound load for the hereinbefore discussed isolators as a function of time. In each of the figures, curve A represents the helical spring isolator; curve B represents the elastomer isolator; curve C represents the canted-coil isolator; curve D represents the hollow elastomer canted-coil isolator; and curve E represents the solid elastomer canted-coil isolator. The curves show the different percentages of deflection and how the amplitude and equilibrium are affected by transient shock loading. Deflection ranges from 10% to 50% are shown over a time from 0 to 0.2 second. It may be observed that the elastomer isolator shows the smallest amplitude in all deflections, whereas the helical coil spring isolator maintains a higher amplitude over a period of time than any other isolator with the lowest damping.

The canted-coil spring exhibits a high amplitude at load deflection; i.e., the amplitude decreases as the deflection increases. The hollow elastomer canted-coil isolator exhibits a low amplitude at load deflection and such amplitude decreases rapidly with time, having very high damping. The solid elastomer canted-coil isolator shows a very low amplitude with the amplitude decreasing substantially as the time increases also as the deflection increases.

It can be concluded from the curves shown in FIGS. 27-29 that the hollow elastomer canted-coil isolator offers a combination of high damping that results in low amplitude and such amplitude decreases with time and deflection, providing a good, useful isolator mount. The hollow elastomer canted-coil isolator produces the high displacement with relatively quick restoration of equilibrium. Correspondingly, the solid elastomer canted-coil isolator reduces the amplitude of displacement and equilibrium restoration time.

It should be appreciated that, as hereinbefore pointed out, the elastomer can be bonded to the canted-coil spring to provide better support and higher loading than an unbonded elastomer. Of course, the manner in which the elastomer is bonded, variations in vibration and isolation are other factors to be considered along with the hardness of the elastomer employed, among other factors, to select the ultimate combination chosen. However, the present invention enables the tailoring of isolator mounts, which were hereinbefore unavailable, and thus provides a significant advantage in this field.

Although there has been hereinabove described a specific arrangement of the isolator mount assembly, in accordance with the present invention, for the purpose of illustrating the manner in which the invention may be used to advantage, it should be appreciated that the invention is not limited thereto. Accordingly, any and all modifications, variations, or equivalent arrangements, which may occur to those skilled in the art, should be considered to be within the scope of the invention as defined in the appended claims.

What is claimed is:

1. An isolator mount assembly comprising:
   a support structure;
   a device; and
   isolator means, disposed between said support structure and said device for reducing transmission of mechanical vibration therebetween; said isolator means comprising a plurality of canted-coil means, interconnected with one another, for causing the isolator means to exert a generally constant force in a loading direction approximately normal to a center line of said plurality of coil means in response to deflection of the coils within a specific range along said loading direction due to mechanical vibration of one of the support structures and the device, and for causing the isolator means to exert a substantially greater force when the coils are deflected beyond said specific range.

2. The isolator mount assembly according to claim 1 wherein said substantially greater force is up to about 11 times greater than the generally constant force.

3. The isolator mount assembly according to claim 1 further comprising elastic material means, disposed around and between said plurality of coils, for modifying an isolation efficiency of the isolator means.

4. The isolator mount assembly according to claim 3 wherein said elastic material has a solid cross-section.

5. The isolator mount assembly according to claim 4 wherein the substantially greater force is up to about three times greater than the generally constant force.

6. The isolator mount assembly according to claim 4 wherein the elastic material is bonded to the plurality of coils.

7. The isolator mount assembly according to claim 4 wherein the elastic material is not bonded to the plurality of coils.

8. The isolator mount assembly according to claim 3 wherein said elastic material has a hollow cross-section.

9. The isolator mount assembly according to claim 8 wherein the substantially greater force is up to about seven times greater than the generally constant force.

10. The isolator mount assembly according to claim 8 wherein the elastic material is bonded to the plurality of coils.

11. The isolator mount assembly according to claim 8 wherein the elastic material is not bonded to the plurality of coils.

12. The isolator mount assembly according to claim 1, wherein ends of said plurality of interconnected coils are joined in order to form a continuous spring.

13. The isolator mount assembly according to claim 1 wherein each of the interconnected coils has an elliptical shape and further comprising groove means, disposed in one of said support structures and device, for supporting the isolator in a position causing loading thereof by the support structure and device to be along a major axis of the plurality of interconnected coils.

14. The isolator mount assembly according to claim 1 wherein each of the interconnected coils has an elliptical shape and further comprising groove and wedge means for causing loading of the isolator along a minor axis of the plurality of interconnected coils.

15. The isolator mount assembly according to claim 12 wherein each of the interconnected coils has an elliptical shape and further comprising groove means, disposed in one of said support structures and device, for supporting the isolator in a position causing loading thereof by the support structure and device to be along a major axis of the plurality of interconnected coils.

16. The isolator mount assembly according to claim 12 wherein each of the interconnected coils has an elliptical shape and further comprising groove and wedge means for causing loading of the isolator along a minor axis of the plurality of interconnected coils.

17. The isolator mount assembly according to claim 15 wherein said continuous spring is assembled in said groove means with a turn angle of about 70°.

18. The isolator mount assembly according to claim 1 wherein said support structure is a cylinder.

19. The isolator mount assembly according to claim 1, wherein isolator means comprising two canted-coil springs, each having a plurality of canted coils, with one canted-coil spring being disposed within another canted-coil spring.

20. The isolator mount assembly according to claim 19 wherein the two canted coil springs have coils canted in the same direction along a common center line thereof.

21. The isolator mount assembly according to claim 19 wherein the two canted-coil springs have coils canted in opposite directions along a common center line thereof.

22. The isolator mount assembly apparatus according to claim 12 wherein each of the interconnected coils has an elliptical shape and the apparatus further comprises means for causing loading of the coils to be along a major axis of the coils.

23. The isolator mount assembly apparatus according to claim 12 wherein each of the interconnected coils has an elliptical shape and the apparatus further comprises means for causing loading of the coils to be along a minor axis of the coils.

24. The isolator mount assembly according to claim 22 wherein said continuous spring is assembled in said groove means with a turn angle of about 70°.

25. The isolator mount assembly apparatus according to claim 20 wherein said continuous spring is assembled in said groove means with a turn angle of about 70°.

26. An isolator mount assembly comprising:
a support structure;
a device; and
isolator spring means, disposed between said support structure and said device, for absorbing mechanical vibrational energy, said isolator means comprising a plurality of canted coils having a damping ratio of about 0.025 at the resonance frequency of the isolator spring means, said plurality of coils being interconnected with one another, for causing the isolator spring means to exert a generally constant force in a loading direction approximately normal to a center line of said plurality of coils in response to deflection of the coils within a specific range along said loading direction due to mechanical vibration of one of the support structures and the device, and for causing the isolator means to exert a substantially greater force when the coils are deflected beyond said specific range.

27. The isolator mount assembly according to claim 25 further comprising elastic material means, disposed around and between the plurality of coils, for increasing the damping ratio.

28. The isolator mount assembly according to claim 27 wherein said elastic material means has a solid cross-section and the damping ratio at the isolator spring means resonance frequency is increased to about 0.2.

29. The isolator mount assembly according to claim 27 wherein said elastic material means has a hollow cross-section and the damping ratio at the isolator spring means resonance frequency is increased to about 0.1.

30. An isolator mount assembly comprising:
a support structure;
a device; and
sealing isolator means, disposed between said support structure and said device for reducing transmission of mechanical vibration therebetween and for providing a pressure seal therebetween, said sealing isolator means comprising a plurality of canted coils and an elastic material disposed around and between said plurality of canted coils, said plurality of canted coils being interconnected with one another, for causing the isolator means to exert a generally constant force in a loading direction approximately normal to a center line of said plurality of canted coils in response to deflection of the canted coils within a specific range along said loading direction due to mechanical vibration of one of the support structures and the device, and for causing the isolator means to exert a substantially greater force when the coils are deflected beyond said specific range.

31. An isolator mount assembly comprising:
a support structure;

a device; and isolator means, disposed between said support structure and said device for absorbing mechanical vibrational energy, said isolator means comprising a plurality of canted coils having an energy absorption factor of about two times the energy absorption factor of a helical spring having coils of substantially the same size and wire diameter as the plurality of canted coils, said plurality of canted coils being interconnected with one another, for causing the isolator means to exert a generally constant force in a loading direction approximately normal to a center line of said plurality of canted coils in response to deflection of the canted coils within a specific range along said loading direction due to mechanical vibration of one of the support structures and the device, and for causing the isolator means to exert a substantially greater force when the coils are deflected beyond said specific range.

32. The isolator mount assembly according to claim 31 further comprising elastic material means, disposed around and between the plurality of canted coils, for increasing the energy absorption factor.

33. The isolator mount assembly according to claim 32 wherein said elastic material means has a solid cross-section and the energy absorption factor is increased to about 3.5.

34. The isolator mount assembly according to claim 32 wherein said elastic material means has a hollow cross-section and the energy absorption factor is increased to about 2.2.

35. An isolator mount assembly comprising:

a support structure;

a device;

isolator spring means, disposed between said support structure and said device for absorbing mechanical vibrational energy, said isolator means comprising a plurality of canted coils of elliptical shape, said plurality of canted coils being interconnected with one another, for causing the isolator means to exert a generally constant force in a loading direction approximately normal to a center line of said plurality of canted coils in response to deflection of the canted coils within a specific range along said loading direction due to mechanical vibration of one of the support structures and the device, and for causing the isolator means to exert a substantially greater force when the coils are deflected beyond said specific range; and means for causing displacement between said support structure and device to load the isolator spring means along a major axis of the coils.

36. An isolator mount assembly comprising:

a support structure;

a device;

isolator spring means, disposed between said support structure and said device for absorbing mechanical vibrational energy, said isolator means comprising a plurality of canted coils of elliptical shape, said plurality of canted coils being interconnected with one another, for causing the isolator means to exert a generally constant force in a loading direction approximately normal to a center line of said plurality of canted coils in response to deflection of the canted coils within a specific range along said loading direction due to mechanical vibration of one of the support structures and the device, and for causing the isolator means to exert a substantially greater force when the coils are deflected beyond said specific range; and means for causing displacement between said support structure and device to load the isolator spring means along a minor axis of the coils.

37. The isolator mount assembly according to claim 35 wherein ends of the plurality of canted coils are connected to form a continuous garter-type spring.

38. Tho isolator mount assembly according to claim 37 wherein the means for causing displacement between said support structure and said device includes a groove in one of tho support structures and device.

39. The isolator mount assembly according to claim 38 wherein said continuous garter-type spring is assembled in said groove with a turn angle of about 70°.

40. An isolator mount assembly comprising:

a support structure;

a device; and isolator means, disposed between said support structure and said device, for reducing transmission of mechanical vibration therebetween; said isolator means comprising a plurality canted-coil means for;

causing the isolator means to exert a generally constant force in a loading direction approximately normal to a center line of said plurality of coil means in response to deflection of the coils within a specific range along said loading direction, and;

for providing overload protection when the coils are deflected beyond said specific range.

41. The isolator mount assembly according to claim 42 further comprising elastic material means, disposed around and between said plurality of coils, for modifying an isolation efficiency of the isolator means.

42. The isolator mount assembly according to claim 41 wherein said elastic material has a solid cross-section.

43. The isolator mount assembly according to claim 42 wherein the elastic material is bonded to the. plurality of coils.

44. The isolator mount assembly according to claim 42 wherein the elastic material is not bonded to the plurality of coils.

45. The isolator mount assembly according to claim 41 wherein said elastic material has a hollow cross-section.

46. The isolator mount assembly according to claim 45 wherein the elastic material is bonded to the plurality of coils.

47. The isolator mount assembly according to claim 45 wherein the elastic material is not bonded to the plurality of coils.

* * * * *